United States Patent [19]

Thigpen

[11] Patent Number: 4,541,079

[45] Date of Patent: Sep. 10, 1985

[54] MARINE STREAMER CABLE RECOVERY SYSTEM

[75] Inventor: Ben B. Thigpen, Houston, Tex.

[73] Assignee: Western Geophysical Company of America, Houston, Tex.

[21] Appl. No.: 461,399

[22] Filed: Jan. 27, 1983

[51] Int. Cl.³ .............................. G01V 1/38; H01B 7/12
[52] U.S. Cl. ..................................... 367/19; 367/106; 367/130; 114/245
[58] Field of Search ..................................... 367/16–19, 367/130, 133, 131, 106, 6, 77, 24; 181/110; 114/245

[56] References Cited

U.S. PATENT DOCUMENTS

| | | | |
|---|---|---|---|
| 2,952,834 | 9/1960 | Noonan et al. | 367/24 |
| 3,077,944 | 2/1963 | Padberg, Jr. | 181/120 |
| 3,376,948 | 4/1968 | Morrow | 181/0.5 |
| 3,794,965 | 2/1974 | Charske | 367/18 |
| 3,860,900 | 1/1975 | Scudder | 367/6 |
| 4,388,710 | 6/1983 | Pecon, Jr. | 367/6 |

Primary Examiner—Nelson Moskowitz
Assistant Examiner—Ian J. Lobo
Attorney, Agent, or Firm—William A. Knox

[57] ABSTRACT

Selected sections of a seismic streamer cable are provided with an acoustically-triggered compressed gas supply. The acoustic triggering devices associated with each compressed gas supply may be individually addressed by a coded signal. In the event that the streamer cable is severed, the gas supplies of the severed sections of the streamer are used to inflate the jackets of those severed sections so that they will float to the water surface for salvage.

2 Claims, 2 Drawing Figures

MARINE STREAMER CABLE RECOVERY SYSTEM

BACKGROUND OF THE INVENTION

1. Field of the Invention

This invention is concerned with a system for locating and recovering a marine seismic streamer cable that has broken loose from a towing vessel.

2. Discussion of the Prior Art

In marine seismic exploration, a sound source is immersed in the water and is triggered at selected intervals. The acoustic waves emanating from the sound source travel downwardly into the earth beneath the water. The acoustic waves are reflected from the various earth layers and return towards the water surface. A ship tows a streamer cable containing a plurality of hydrophones. The hydrophones sense the reflected acoustic waves and convert them to electrical signals. The resulting electrical signals are transmitted back to the towing ship where the signals are processed and tape-recorded for future study.

A streamer cable is made up of a plurality of individual sections of plastic tubing, each about two and three quarters inches in diameter and 200 to 300 feet long. Fifty or more such sections may be used so that the entire cable may be more than two miles long. Each section contains a plurality of hydrophones and the required electrical conductors for signal transmission. Stress members are threaded longitudinally through the cable sections and are secured to bulkheads that terminate each end of a section. Suitable connector devices couple each section to an adjacent section. The sections are filled with a light fluid to render them neutrally bouyant. To facilitate filling the tube, an oil-fill hole is provided in each terminating bulkhead. Further details of construction and methods of towing the streamer cable at a desired depth are well known in the seismic art and are disclosed in a plethora of patents, so a further detailed review is not required here.

Great care is taken to advise passing ships of the presence of the towed submerged streamer cable by use of tail buoys and certain recognized marine warning signals displayed by the towing ship. Nevertheless, occasionally a passing vessel will foul the cable and accidentally, or deliberately, cut the cable loose from the towing ship. Sometimes an unmarked submarine hazard will snag the cable; before the towing vessel can stop, the cable is torn apart. Modern streamer cables may cost more than half of a million dollars. Loss of all or a portion of a cable represents a severe financial loss. Therefore a cable recovery system is desirable.

Most cable recovery systems rely on the use of a tail buoy that is tied by a long nylon (or other synthetic-fiber) rope to the far, trailing end of the streamer cable. The tail buoy is provided with a radio beacon, radar target and/or a xenon flasher light. If the cable breaks, the towing ship homes in on the tail buoy, if, that is, the tail buoy is still afloat. However, without the light fill fluid, a ruptured cable section, including hydrophones, electrical conductors, stress members and the like, is much heavier than an equal volume of water. Therefore, when a cable section is severed, the tubing loses its fill fluid and that section can be expected to collapse and sink. It may even drag under the rest of the cable and cause the tail buoy to become awash or sink.

U.S. Pat. No. 3,794,965 teaches a marine streamer cable having adjustable bouyancy for holding the cable at a desired depth under tow. In that system, between consecutive cable sections a bouyancy unit is installed. The buoyancy unit basically consists of a float chamber that is filled with a gas. Buoyancy is adjusted by pumping in or blowing ballast water from the tank, under operator control. In the event of a power failure or if the cable is broken, the system by default blows the ballast tanks to render the cable positively buoyant. The fail-safe feature is of course only applicable to that particular system or a colorable equivalent. The system would be inappropriate for general use because of the requirement for special electrical control lines threaded in the cable itself.

It is an object of this invention to provide an emergency streamer cable recovery system that is self-sufficient and is readily adaptable to any streamer cable without special wiring inside the cable or internal control lines and a system that requires a minimum of special equipment.

SUMMARY OF THE INVENTION

In a preferred embodiment of this invention, there is provided a multi-section marine streamer cable in which the mechanical and electrical hardware is enclosed within an outer jacket. Desired sections include a small supply of compressed gas that is fluidly communicatable with the interior of the jacket. The compressed gas supplies are operatively interfaced with an addressable transponder device that is responsive to an encoded acoustic alarm signal. In response to such an alarm signal, the transponder, which is interconnected with the compressed gas supply, causes the compressed gas to inflate the outer cable jacket, thereby rendering one or more desired cable sections positively bouyant. When an emergency occurs, the alarm signal is generated and transmitted from a special signal transmitter that is towed near a cable-towing ship. If the streamer cable is cut, the loose sections first are identified. The transmitter then sends out encoded acoustic alarm signals addressed to the streamer sections identified as being severed which then are inflated in response to the alarm to become positively bouyant and hence float to the surface of the water.

In an aspect of this invention, a dedicated hydrophone array is co-located with the transmitter. The transmitter addresses in sequence the identified cable sections. The transponders, in those cable sections, in response, return answerback signals which are received by the hydrophone array. By measuring the time differences between the respective transmitted and received signals, the range and direction to the cut-off cable sections can be determined by triangulation.

BRIEF DESCRIPTION OF THE DRAWINGS

The objects and benefits of this invention may best be understood from the appended detailed description and the drawings where.

DETAILED DESCRIPTION OF A PREFERRED EMBODIMENT

Figure 1:
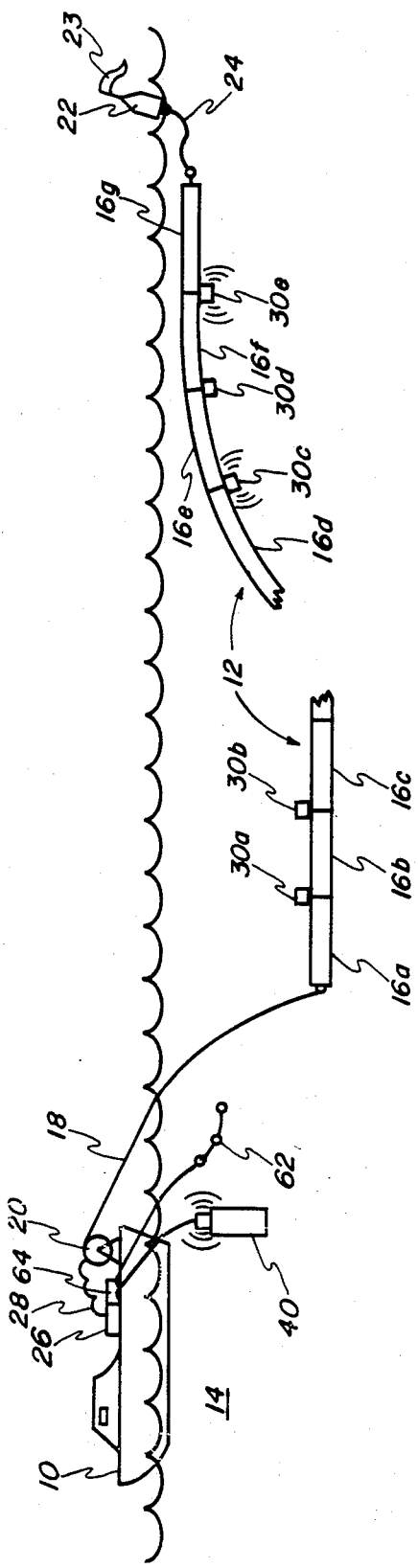
FIG. 1 is a showing of a ship towing a seismic marine streamer, a portion of which has been severed.

Referring now to FIG. 1, there is shown a ship 10 towing a seismic streamer cable 12 through a body of water 14. The streamer cable 10 consists of a plurality of separate sections, 16a–16g, of which sections 16d–16g have been severed from the front part of the streamer cable at section 16d. The individual sections may be 100–300 feet long. Seven sections are shown, but fifty or more sections may be used in commercial operations. Streamer cable 12 is secured to the ship 10 by lead-in 18 which is attached to cable storage reel 20. A tail buoy 22 is tied to the end of cable 12 by means of a long (100–200 ft.) resilient rope 24 such as nylon or other similar material. The tail buoy may optionally be provided with an acoustic, electromagnetic or visual homing device 23.

Each cable section includes hydrophones, signal transmission lines and metallic stress members (not shown) which collectively are referred to as a "carcass". As is well known to the art, the carcass is covered by a plastic jacket in the form of an elongated tube of about 2.75" O.D., with a ⅛" wall thickness. As mentioned earlier, the jacket is filled with a lightweight ballast fluid to render the sections neutrally or slightly positively bouyant. When full of fluid, the interior of the jacket is at atmospheric pressure; that is, the jacket is not inflated. Without the fluid, the dead weight of the carcass, in water, is on the order of 150 to 200 pounds. Thus, if a cable section is severed, the ruptured jacket will collapse, expelling the fluid. The collapsed jacket and the carcass may then present a negative buoyancy of 150–200 pounds, hanging from the end of the remaining intact sections as shown in FIG. 1 at 16e–16g. Since the intact sections 16e–16g are approximately neutrally bouyant, that is, just barely awash, the dead weight of section 16d could drag to the bottom the entire severed portion of the cable except for whatever positive lift may be provided by tail buoy 22.

Figure 2:
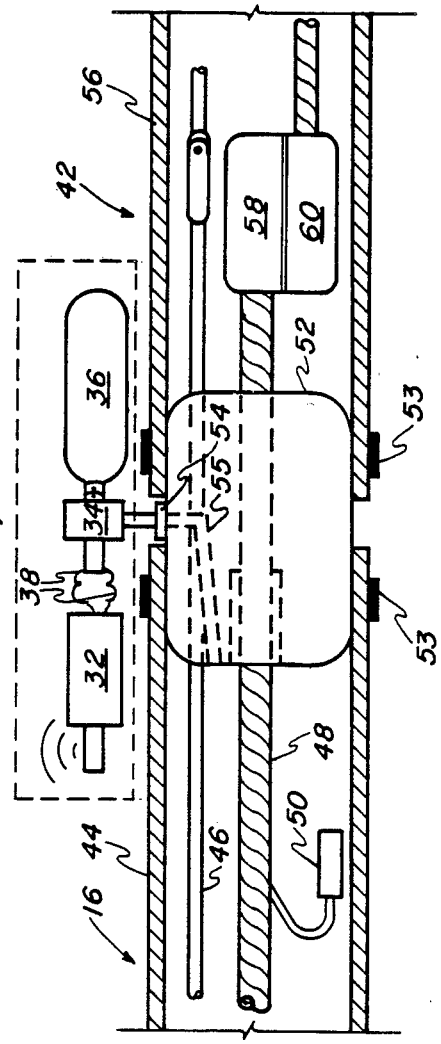
FIG. 2 is a schematic illustration of a transponder-triggerable supply of compressed gas for use in inflating a cable section upon command.

In this invention, I provide active means for inflating the jacket of selected streamer cable sections to render them positively bouyant in the event of a cable catastrophe. To that end, I provide selected cable sections with an acoustically-controlled supply of compressed gas. Upon operator command, encoded acoustic signals are transmitted to certain cable sections, such as the severed sections. A transponder, coupled to a solenoid valve connected to a bottle of compressed gas, opens a valve to release the gas into the section jacket thereby to inflate the jacket to a desired diameter against the ambient water pressure as will be more thoroughly discussed in connection with FIG. 2. An increase in diameter, of course, provides a substantial increase in bouyancy. For example, given that a cable section has an O.D. of 2.75" and is 200 feet long, it will displace about 8.25 cubic feet of water. If the diameter is increased by only ⅜", the displacement becomes about 10.65 cubic feet, a gain of 2.40 cubic feet. Assuming that sea water density is 64 pounds per cubic foot, there is a net gain for each intact section of more than 150 pounds of positive bouyancy, enough to support the dead weight of the severed cable section.

Returning again to FIG. 1, streamer cable 12 has been severed at section 16d. Seismic signals from the hydrophones (not shown in FIG. 1) in cable 12 send signals back to signal processing equipment 26 aboard ship 10, via deck cable 28 which in turn is connected to conductors in lead-in 18. When cable section 16d became severed, an operator of the signal processing equipment is immediately aware of the catastrophe because he no longer receives meaningful signals from that end of the cable. He can therefore identify the severed sections. In addition, there are other instruments, well known to the art, for measuring mechanical parameters of the cable such as depth, direction etc. Abrupt failure of those instruments provide backup identification.

Selected cable sections include a module such as 30a–30e containing an acoustic transponder 32 (FIG. 2) operatively connected to a solenoid-triggered valve 34 that normally closes a compressed gas bottle 36. Transponder 32, upon command, furnishes a switch closure that electrically actuates solenoid valve 34 over leads 38. Transponder 32 responds to an encoded acoustic alarm signal, the frequency of which lies in the kilohertz region. That frequency is well above normal seismic frequencies; therefore, seismic signals will not falsely trigger the transponders. Each module 30a–30e, may be set to recognize a different acoustic pulse code so that the respective cable sections can be selectively addressed. Such transponders are well known, and per se, form no part of this invention. For example, a suitable unit is Model 281-2.3 Underwater Command Control assembly made by Edo Western Corp. of Salt Lake City, Utah.

When the operator detects a severed cable, he lowers a command transducer 40 (FIG. 1) over the side of ship 10. A suitable transducer is model 281-2.2 Command Transducer, also made by Edo Western. Connected to a surface command assembly associated with signal processing equipment 26, transducer 40 transmits a sequence of differently encoded acoustic alarm signals addressed to those transponders that the operator desires to activate.

Returning to FIG. 2 there is shown a portion of one end of a first cable section and a portion of the cable connector assembly 42 for coupling an adjacent section to the first cable section. Details of construction of seismic streamer cables are well known to the art but a brief review will be presented here for the sake of completeness. Outer jacket 44 encloses one or more steel stress members such as 46 and a bundle of conductors 48 for transmitting signals from a plurality of hydrophones such as 50. Stress member 46 is anchored to bulkhead 52 and extends through the bulkhead to connector assembly 42. Fluid-tight seals are provided around conductor bundle 48 and stress member 46 where they penetrate bulkhead 52. External steel bands 53 secure jacket 44 to bulkhead 52. An oil fill hole 53 is provided in bulkhead 52 for filling cable 16 with fluid. Connector section assembly 42 includes an external jacket or sleeve 56. Connector plugs 58 and 60 interconnect the conductors of cable section 16 to an adjacent section, not shown. Airplane-type clevises 62 interconnect the stress members between adjacent sections. For example, see Morrow, U.S. Pat. No. 3,376,948, FIGS. 1 and 1a.

As described previously, module 30, represented by dashed lines, encloses transponder 32, valve 34 and compressed gas bottle 36. The discharge duct of valve 34 is coupled to oil fill hole 54. That is, after the cable section has been filled with the requisite amount of fluid, module 30 may be attached to the cable as shown. If externally mounted, module 30 is preferably streamlined and secured to the cable by any convenient means. Alternatively, the contents of module 30 could be mounted inside the sleeve of connector assembly 42 if that assembly is lengthened somewhat to accomodate the extra bulk. The material of constructon of module 30 must, of course be acoustically transparent.

I have found by actual measurement, that expansion of the diameter of skin 44 from 2.75" OD to 3.125", an expansion of ⅜", requires an over-pressure of ten to twenty psi (pounds per square inch) depending on the type of plastic used and the ambient water pressure. The size of bottle 36 depends of course on the actual size of the cable section. For a 200-foot cable section, a compressed-gas capacity of about 0.05 cubic foot at 2200 psi would suffice. Such a bottle would be about 3.5" in diameter and 9" long. Any inert gas may be used but nitrogen is preferred because a suitable high pressure of about 2200 psi can be maintained in the bottle as opposed to, say $CO_2$ where the partial pressure is only about 800–900 psi.

Suitable valves and bottles may be obtained from manufacturers of fire extinguishing systems such as Walter Kidde & Co., Inc. of Belleville, N.J. Generally such bottles are sealed by a rupture disk. To release the gas, a hollow pointed plunger is punched through the rupture disk. Gas flows out through the hollow plunger to an outlet port. The plunger may be driven by a solenoid or by any suitable mechanical trigger device. The entire valve assembly is screwed to the threaded neck of the gas bottle. One such assembly is shown in U.S. Pat. No. 3,077,944 to Padberg, Jr. With particular reference to FIG. 5 of that patent, there is shown a depth-sensitive trigger mechanism. The depth trigger could easily be converted to a solenoid-operated valve by one skilled in the art.

In operation, when the operator discovers that the streamer cable has been cut, the operator identifies the severed sections and deploys tranducer 40 over the ship's side. A surface command assembly 64, such as EDO 281-2.1, programs the tranducer to radiate a sequence of singularly encoded alarm signals. The transducer, which may be of any well-known type, is provided with well-known immersion turn-on electrodes so that the transducer commences transmitting as soon as it is in the water. Each singularly encoded acoustic signal of the sequence is designed to address a specific, selected cable section. The acoustic alarm signal may preferably be pulse-coded; for most applications, four to six binary-coded pulses are sufficient to address up to 64 cable sections that may be equipped with floatation modules. When a transponder such as 32 receives and recognizes an alarm signal, it executes a switch closure to trigger valve 34. Gas from compressed gas supply 36 is then fed through oil fill hole 54, through passageway 55 and into cable section 16 to inflate same. At the same time, transponder 32 emits an acoustic, encoded answerback or reply signal. Each time transducer 40 sends out an interrogation signal, transponder 30 will return a reply. Also, after the first switch closure, the solenoid plunger part of the circuitry may be disabled if desired but leaving the answerback circuitry in operative condition. Typically transducer 40 sends out a signal every few seconds depending on the two-way pulse travel time between transducer 40 and transponder 32.

A hydrophone array 62 is deployed behind the ship 10. Hydrophone array 62 is tuned to receive the alarm signal from the transducer 40 and to receive answerback signals from the transponders such as 32. Means included with surface command assembly 64 are provided for measuring the difference in elapsed time between transmission of an alarm signal and reception of an answerback signal. From that measurement, the range can be determined between transducer and remote transponder. One convenient means for range measurement is a precision depth recorder of any well known type such as Edo's model 333. In such a recorder, a stylus sweeps across a moving strip chart at desired intervals of a few seconds. During a single sweep the stylus marks the chart first with the instant of alarm signal transmission; at a later time, the stylus marks the time of the answerback signal reception. The distance between marks is a direct measure of the range.

In an actual operation, upon discovery of a severed cable, the operator would deploy transducer 40 and address the acoustic alarm signal to all of the identified sections having transponders to quickly urge the severed part of the cable to the surface. Thereafter, he might then address only the closest and farthest transponders of the severed portion to provide two discrete range readings. Knowing the ship's heading, the difference in the two ranges would provide him with the direction to the severed cable.

Under tow, the streamer cable tends to randomly twist about its longitudinal axis. Nevertheless, at operating depth, the acoustic transponders always remain under water so that acoustic signals can be received and transmitted. With a free-floating severed cable, near or at the water surface, having externally mounted modules 30, the off-center weight of the modules will tend to unbalance the cable about the longitudinal axis. The modules would tend to come to rest in the water underneath the cable sections. That is an advantage because that attitude would ensure that the transponders will remain submerged and so, be able to receive and transmit acoustic signals efficiently.

I claim as my invention:

1. A system for recovering a severed portion of a seismic marine streamer cable that is towed by a ship through a body of water, the streamer cable consisting of coupled-together cable sections, each including a carcass and an inflatable plastic jacket, comprising:

acoustically-transparent transponder modules secured externally to the jacket of selected cable sections, said transponder modules including a container of pressurized gas, the container being sealed by a solenoid-actuated exhaust valve which is in fluid communication with the interior of the jacket of the cable section to which each module is secured;

an acoustic transponder mounted in each said module, operatively connected with the solenoid-actuated exhaust valve;

a signaling device associated with the towing ship for emitting an encoded acoustic alarm signal for reception by said transponder modules so that in response to the encoded acoustic alarm signal, the transponder triggers the solenoid-actuated exhaust valve to open, thereby inflating the jacket of each cable section to which a transponder module is secured.

means, associated with said transponder, for transmitting an encoded acoustic answerback signal in response to reception of said encoded acoutic alarm signal from said signalling device.

means associated with said signalling device, for receiving said encoded acoustic answerback signals and determining therefrom the distance and direction of the severed portion of the seismic streamer cable, with respect to the towing ship.

2. The system as defined by claim 1, comprising: means, in said signalling device for transmitting a series of singularly-encoded signals during a selected time span; the respective acoustic transponder being responsive to a different one of said sequence of singularly-encoded acoustic alarm signals so that the cable sections may be individually addressed.

* * * * *